United States Patent [19]
Komninos

[11] Patent Number: 5,432,755
[45] Date of Patent: Jul. 11, 1995

[54] ULTRASONIC SIGNAL DETECTOR

[76] Inventor: Nikolaos I. Komninos, 2802-B W. Long Dr., Littleton, Colo. 80120

[21] Appl. No.: 208,536

[22] Filed: Mar. 8, 1994

[51] Int. Cl.⁶ ............................................. H04B 1/06
[52] U.S. Cl. .................................................. 367/135
[58] Field of Search ............... 367/135, 116, 131, 132, 367/133, 134; 73/592, 40.5 A; 381/98

[56] References Cited

U.S. PATENT DOCUMENTS

| | | |
|---|---|---|
| 3,500,676 | 3/1968 | Palmer . |
| 3,784,754 | 1/1974 | Hagiwara et al. . |
| 3,978,915 | 9/1976 | Harris ............................ 73/40.5 A |
| 4,130,734 | 12/1978 | Lee . |
| 4,461,022 | 7/1984 | Slagley . |
| 5,089,997 | 2/1992 | Pecukonis ............................ 367/135 |
| 5,103,675 | 4/1992 | Komninos ............................ 73/592 |

Primary Examiner—Daniel T. Pihulic
Attorney, Agent, or Firm—Timothy J. Martin

[57] ABSTRACT

An ultrasonic detector for monitoring ultrasonic signals which have a selected ultrasonic frequency range and for producing an audible signal in response to the ultrasonic signals. The ultrasonic detector employs a sensor element which produces electrical signals in response to ultrasonic signals. Amplification and filter circuitry to remove all frequency components not within the selected range to produce a mixer input signal. An oscillator for producing a reference signal at a selected reference frequency. A mixer to receive the output of the filter circuitry and the oscillator to produce a mixed composite signal between 0 and 20 kHz and the composite signal amplitude corresponding to the input signal amplitude. The composite signal is passed through a low pass filter to produce a filtered composite signal. The filtered composite signal has a first component that is then amplified by a first amplifier to produce an audio signal which may be output to a suitable audio device. A second component of the filtered composite signal is amplified by a second amplifier, and a RSSI (Received Signal Strength Indicator) circuit is used to produce a strength indicator signal that may be displayed by a suitable visual display.

25 Claims, 4 Drawing Sheets

ULTRASONIC SIGNAL DETECTOR

FIELD OF THE INVENTION

The present invention generally concerns the detection of ultrasonic signals. More particularly, the present invention is directed to ultrasonic detectors that receive ultrasonic signals and convert those signals into frequencies that are audible to the human ear.

BACKGROUND OF THE INVENTION

A variety of different ultrasonic signal detectors have been developed in the past in order to monitor a broad range of ambient signals in the ultrasonic range and to convert those signals to audible frequencies. The desirability of ultrasonic detectors has recently increased due to the recognition that ultrasonic detectors may readily be implemented as leak detectors to detect ultrasonic signals which, for example, are created by the escape of pressurized gases through small openings. This is useful, for example, in detecting leakage from pressurized telephone trunk lines, pipelines and in detecting air flow paths, for example, through installation of houses and commercial buildings and through automobile doors and panels.

In the last few years, two types of ultrasonic detectors were prevalent. A first type employs a crystal system to mechanically couple an ultrasonic signal to a local oscillator in order to convert the frequency of the input ultrasonic signal to a resultant signal that has a frequency within the audible range. While being relatively inexpensive, crystal based systems have exhibited limited performance and have significant problems of sensitivity. These crystal based systems are susceptible to noise and have problems with signal-to-noise ratio. In addition, crystal base systems are susceptible to mechanical vibrations and to temperature changes which can affect their sensitivity and yield false readings. Further, crystal based systems often and undesirably respond to infra-sonic and sonic signals that modulate the system so that again faulty readings occur. These crystal based systems also often have a very limited frequency range for target signals unless there is an ability to adjust the frequency of the local oscillator within the system.

A second system commonly used employs signal mixers that heterodyne a local oscillator with the input signal to generate a composite signal within an audible range. The composite signal is then output through a transducer, such as a pair of headphones, and the intensity of the composite signal, presumably reflective of the intensity of the detected ultrasonic signal, may be displayed by a suitable meter. Heterodyning was done in the past in a number of ways, where the mixer, the most important element, was made either from a diode-ring, an electromechanical device or any non-linear device like a vacuum tube or transistor. Because each of the necessary circuit elements in these translators is discrete, matching components or trimming during production was inevitable. In addition, the noise in the translated audio was quite high due to oscillator energy leakage in the heterodyned signal due to mixer inefficiency. A typical ultrasonic leak detector using an older mixer for translation produces a fair amount of hissing sound even when there is no signal present. This is due to the leakage of high frequency components from the multiplication of the two signals, the oscillator and the incoming sound. Non-linear mixers generate a multitude of mixed products, some of which are in the base band, thus contributing to the noise floor of the system.

Again, these heterodyne systems are susceptible to noise and have a problem with signal-to-noise ratio. Moreover, ultrasonic detectors using the heterodyne circuitry have a problem with signal-to-noise ratio and have a limited frequency range unless the oscillator for each can be adjusted. While these systems do not exhibit problems due to sonic or mechanical vibrations, they are nonetheless susceptible to temperature changes that can yield faulty readings. Further, systems that employ the heterodyne technology require multi-offset settings and are thus difficult to adjust and maintain over an extended period of use.

A much improved ultrasonic detector is described in my U.S. Pat. No. 5,103,675 issued Apr. 14, 1992. This ultrasonic detector offers superior performance to those discussed above. In its detailed circuitry, the ultrasonic signal detector described in the '675 Patent detects ultrasonic signals by a transducer and converts these signals into an electrical transducer signal that is then filtered to remove undesired frequency components so that a resulting input signal results. Processing circuitry is then responsive to the input signal for producing an intermediate signal that has an intermediate signal frequency scaled from the input signal frequency into an audible frequency. The intermediate signal is then amplified proportionally to the input signal amplitude to produce a detector output signal which is then displayed. In the '675 Patent, then, as described in the detailed embodiments, a square-wave signal is produced that has a frequency corresponding to the frequency of the input signal, but at a constant amplitude. This square-wave signal is then scaled to an audible frequency and is then integrated to produce a triangular-wave pulse having this scaled frequency. This triangular-wave pulse is amplified proportionally to the amplitude of the input signal to create a replica of the input signals at the lower frequency.

Despite the improvements of the invention described in the '675 Patent, there remains a need for low cost ultrasonic detectors that are reduced in size and which are inexpensive to use. Indeed, many members of the industry are more comfortable with the tones produced by a heterodyne circuit, including the background noise, since they are more familiar with this technology. Here, the noise is often introduced since the standard heterodyne circuit simply applies a local oscillator frequency along with the input signal to the base of a transistor to generate the composite signal in the audible range. Thus, any noise in the received signal or created by oscillator leakage is passed through to the audible output. Furthermore, where a signal strength indicator is used, the signal strength is usually integrated over the entire spectrum of frequencies as an average of the signal processed by the detector rather than the true amplitude of the detected signal.

Recently advances in the telecommunications industry have produced microcircuits designed for cellular communications which operate in the realm of 100 MHz. These micro-circuitry chips provide very sensitive heterodyne circuits employing a Gilbert Cell mixer to blend a very high frequency local signal against a received very high frequency signal, typically in the range of 100 MHz to 140 MHz. The use of Gilbert Cell mixer technology has not heretofore recognized as appropriate for ultrasonic detectors due to the relatively low frequencies encountered in the ultrasonic environment. Moreover, it has been thought that the technology embodied in the very high frequency telecommunications circuitry could not, in fact, be employed at the lower frequencies of ultrasonic signals. I have surprisingly found that, with the circuit design of the present invention, this technology can, indeed, be employed to produce a very low cost, compact ultrasonic detector which exhibits superior performance.

SUMMARY OF THE INVENTION

It is an object of the present invention to provide a new and useful ultrasonic signal detector which is relatively inexpensive to produce and which is lightweight, compact, and portable.

Another object of the present invention is to provide an ultrasonic signal detector employing Gilbert Cell mixer technology so as to have superior performance.

A further object of the present invention is to provide ultrasonic signal detection circuitry which incorporates existing telecommunication components designed to operate at very high frequencies.

Still a further object of the present invention is to provide ultrasonic detector circuitry having relatively few discrete components.

Another object of the present invention is to provide ultrasonic detector circuitry having suitable filters to remove both ambient noise and noise created by oscillator leakage, thereby producing a cleaner audible tone upon the detection of an ultrasonic ambient signal.

Another object of the present invention is to provide ultrasonic detector circuitry including an output showing received signal strength of a detected signal as opposed to an average signal strength.

Yet another object of the present invention is to provide an ultrasonic detector that is adjustable in sensitivity.

To accomplish these objects, the present invention, then, is directed to an ultrasonic detector for monitoring ultrasonic signals which have a selected ultrasonic frequency range and for producing an audible signal in response to such ultrasonic signals. Here, the ultrasonic detector employs a sensor element which is operative in response to ultrasonic signals to produce an electrical signal. Amplification and filter circuitry operates in response to the electrical signal to remove all frequency components thereof not within the selected range in order to produce an input signal at a selected input signal frequency and amplitude. An oscillator produces a reference signal at a selected reference frequency, and a mixer is operative to receive the input signal and the reference signal to produce a mixed composite signal in response thereto at a frequency of between 0 Hz and 20 Hz at a composite signal amplitude corresponding to the input signal amplitude. Preferably, the selected frequency range is 0 Hz to 3000 Hz. The composite signal is passed through low pass filter circuitry to remove unwanted high frequency signals and/or noise from the composite signal thereby producing a filtered composite signal. The filtered composite signal has a first component that is then amplified by a first amplifier to produce an audio signal which may be output through a suitable audio output device. A second component of the filtered composite signal is amplified by a second amplifier, and an RSSI (Received Signal Strength Indicator) circuit is used to produce a strength indicator signal that may be visually displayed by a suitable visual display.

The present invention is also directed to an ultrasonic detector for monitoring ultrasonic signals having ultrasonic frequencies over the selected range in order to produce an audible sound corresponding thereto, wherein the ultrasonic detector employs a Gilbert Cell mixer to heterodyne the ultrasonic signal. Here, the sensor element responds to a received ultrasonic signal to produce an electrical signal that is amplified and filtered to produce an input signal at an input signal frequency and amplitude. An oscillator produces a reference signal at a reference frequency and amplitude, and the reference signal and the input signal are then mixed by a Gilbert Cell mixer device to produce a mixed composite signal at a composite frequency in the audio range and at a composite signal amplitude proportional to the input signal amplitude. A first amplifier then amplifies the composite signal to produce an audio signal that is output through a suitable audio output device.

In either event, it is preferred that the reference frequency is in a range of 20 kHz to 100 kHz and, most suitably, in a range of 38 kHz plus or minus 500 Hz. Here, also, the amplification and filter circuitry includes a band pass filter having a frequency band centered at a target ultrasonic frequency, such as 40 kHz. The oscillator used with the Gilbert Cell mixer device includes a Colpitts L-C tank circuit having an indicator Q of at least 30. Moreover, it is preferred that the Gilbert Cell mixer device and the oscillator are configured on a common integrated circuit chip. This chip may also include an RSSI (Received Signal Strength Indicator) circuit along with the second amplifier for the signal strength indication. Here, also, the visual display for the signal strength indication is non-linear. Moreover, a composite signal filter may be connected to the mixer, with the composite filter being tuned to the reference frequency, thereby removing oscillator leakage and high frequency noise from the composite signal. Suitable adjustment circuitry for the input signal is also provided to vary the detector sensitivity.

These and other objects of the present invention will become more readily appreciated and understood from a consideration of the following detailed description of the exemplary embodiments when taken together with the accompanying drawings, in which:

DETAILED DESCRIPTION OF THE EXEMPLARY EMBODIMENTS

The present invention is directed to detectors for ultrasonic signals, especially those which are adapted to respond over a selected range to convert such ultrasonic signals into an audible signal. More particularly, this invention is directed to a compact, lightweight and portable unit which is relatively inexpensive to produce. This ultrasonic detector produces a relatively clean audio output of the type typically familiar to users of ultrasonic detectors with a minimum number of components. Moreover, this ultrasonic detector produces visual output of peak received signal strength, which is more representative of the received signal, as opposed to an average of such signal strength. In its preferred form, the present invention employs a telecommunications chip not recognized as being adaptable to an ultrasonic detector due to its designed frequency ranges.

Figure 1:
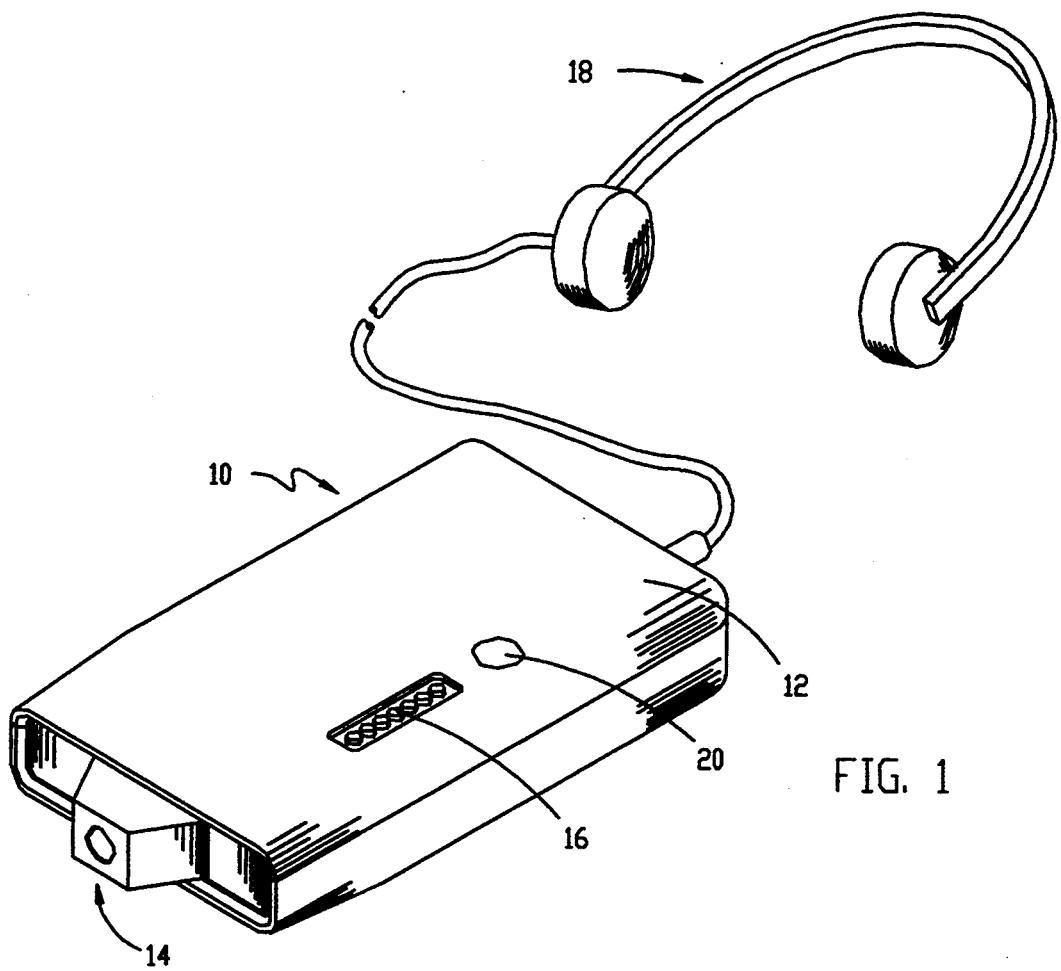
FIG. 1 is a perspective view of an ultrasonic detector according to my invention.

With reference, then, to FIG. 1, ultrasonic detector 10 has a housing 12 which mounts the appropriate processing circuitry. Housing 12 also supports a sensor 14 in the form of a suitable transducer with sensor 14 being selected of a type to receive ultrasonic signals and convert them into suitably corresponding electric signals for processing. Sensor 14 can be either a contact sensor or an ambient air sensor to detect ultrasonic signals either in a solid body or in ambient air, respectively. Housing 12 also supports a signal strength indicating meter 16 which, in FIG. 1, is in the form of a light emitting diode array, which is operative to visually output the signal strength of the received signal from sensor 14. Audible output is obtained by way of earphones 18 which are electrically connected to the circuitry contained within housing 12. Push button activation switch 20 is provided to turn ultrasonic detector on and off.

Figure 2:
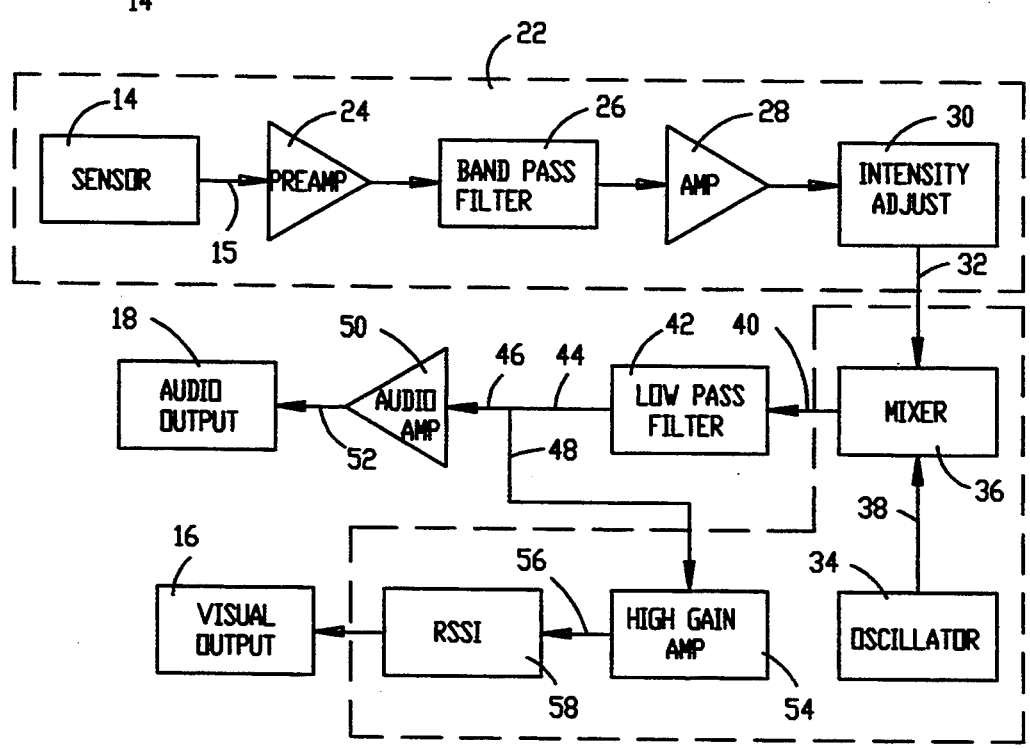
FIG. 2 is a diagrammatic view showing the principal features of the ultrasonic detector circuitry according to a first exemplary embodiment of the present invention.

The principal features of the circuitry according to the preferred exemplary embodiment of the electronic circuitry to be housed in housing 12 to form ultrasonic detector 10 are diagrammed in FIG. 2. Here, it may be seen that the circuitry includes initial amplification and filter circuitry 22 that includes sensor 14, preamplification circuitry 24, band pass filter 26, amplification circuitry 28 and intensity adjustment circuitry 30. With reference to this amplification and filter circuitry 22, it may be appreciated that sensor 14 is operative in response to ultrasonic signals to produce an electrical signal 15 which is then amplified and filtered by means of preamplifier 24, band pass filter 26, amplifier 28 and intensity adjustment circuitry 30 to produce an input signal 32 which is presented to heterodyning circuitry, as described below.

This heterodyning circuitry includes an oscillator 34 and a mixer 36. Oscillator 34 is operative to produce a reference signal at a selected reference frequency preferably within a range of 20 kHz to 100 kHz, depending on the intended range over which the device is intended to operate. Preferably, the reference frequency is 38 kHz plus or minus 500 Hz. Since most ultrasonic signals from pressure or vacuum leaks contain an ultrasonic component of approximately 40 kHz. Mixer 36 is preferably a Gilbert Cell device which receives the input signal from 32 and the reference signal from 38 to produce a mixed composite signal 40. This mixed composite signal 40 accordingly has a composite signal amplitude corresponding to the input signal amplitude and a frequency in the audible range (e.g., between 20 Hz and 20 kHz), but it is preferred that the composite signal have a frequency of about 0-5 kHz. Oscillator 34 and mixer 36 can be configured on a common integrated circuit chip such as a telecommunications chip known as NE602 available from by Philips Components-Signetics of Sunnyvale, Calif.

The mixed composite signal 40 is input into a low pass filter 42 which produces a filtered composite signal 44 that may be split into a first component signal 46 and a second component signal 48. The first component of the filtered composite signal is then amplified by audio amplifier 50 to produce an audio signal 52, with this audio signal 52 then being audibly displayed by audio display 18 which, as noted above, may be a pair of earphones.

The second component 48 of the filtered composite signal 44 is fed into a high-gain amplifier 54 to amplify this component into a signal strength indicator signal 56. This signal may be processed by a received signal strength indicator subcircuit 58 and presented to a visual metered display, such as meter 16 described with respect to FIG. 1. Here, it should be appreciated that the high-gain amplifier 54 along with the RSSI subcircuit may be provided by employing an NE604A microcircuitry also available from by Philips Components-Signetics. Alternatively, and more preferably, oscillator 34, mixer 36, high-gain amplifier 54 and RSSI subcircuitry 58 may be provided by a single integrated circuit chip known as the NE/SA605, again available by Philips Components-Signetics. This microcircuit chip 60 is a telecommunications chip designed to operate at very high frequencies such as, for example, use in cellular telephones, so that it operates in a range of 100 MHz to 140 MHz. Indeed, this chip is designed to be tuned to 10.7 MHz since that is the frequency to which the internal high gain amplifiers are tuned. Surprisingly, however, it has been found that this chip can be made to function in the ultrasonic range but careful selection of components is necessary. Moreover, it should be appreciated that to create the proper oscillator, amplification and RSSI circuits, suitable connections are made to this microcircuit chip 60.

Figure 3A:
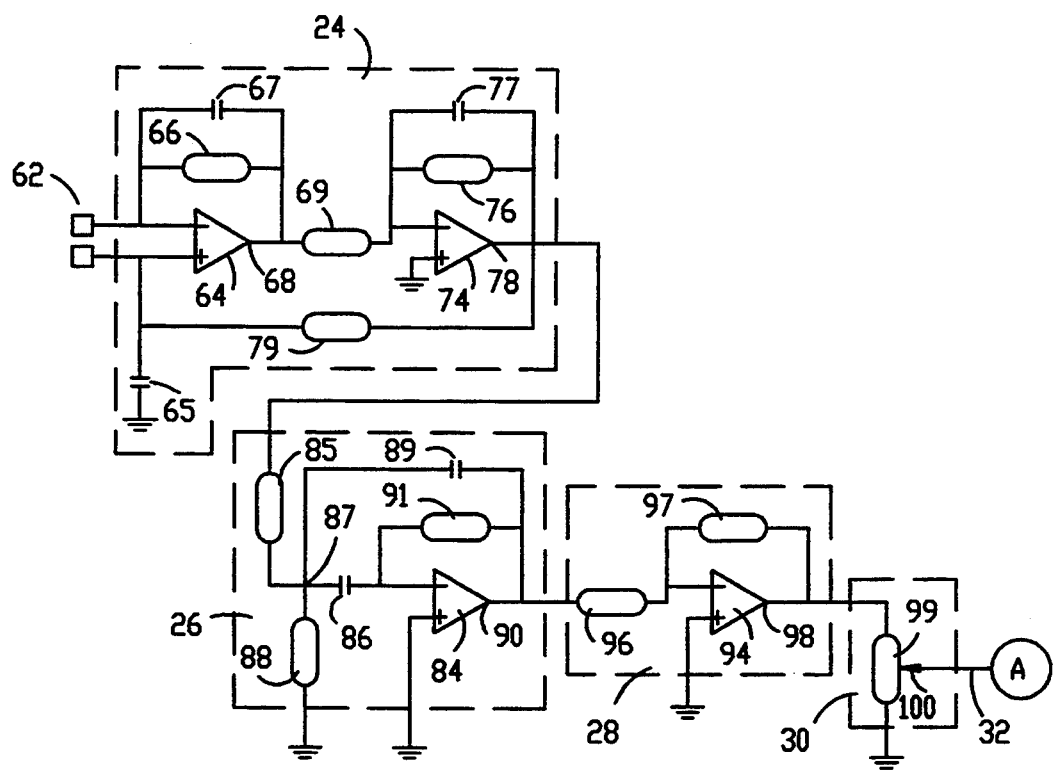
FIGS. 3(a) and 3(b) are a circuit diagram of the general ultrasonic detector circuitry diagrammed in FIG. 2.
Figure 3B:
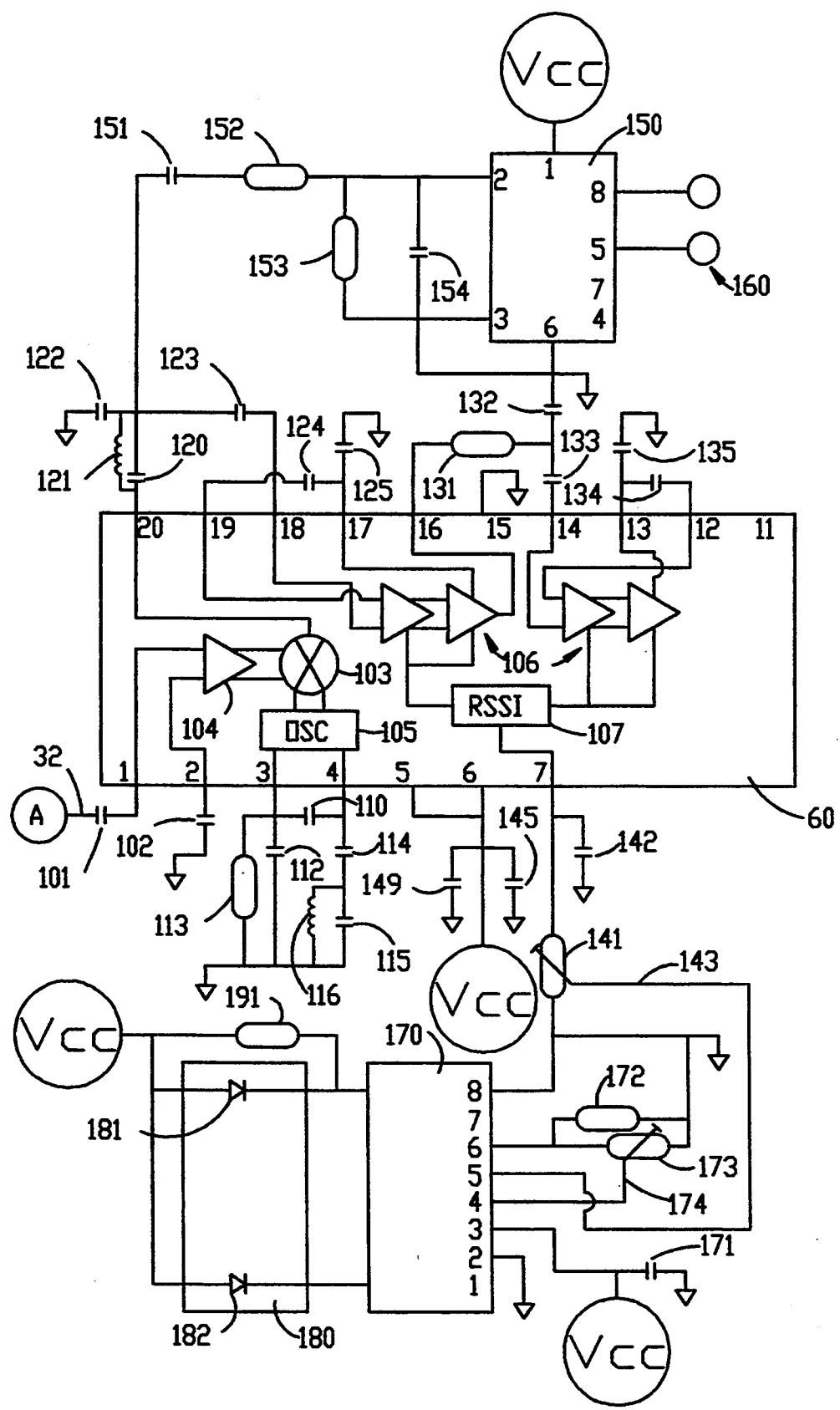

Accordingly, a complete circuit diagram of the circuitry summarily diagrammed in FIG. 2 is shown in FIGS. 3(a) and 3(b). With reference then to FIG. 3(a), it may be seen that the electrical signal 15 produced by sensor 14 is input at 62 where it is amplified by means of a pair of inverting preamplifiers 64 and 74. Here, inputs from sensor 14 at 62 are connected to the positive and negative terminals of amplifier 64. The positive or non-inverting input terminal of amplifier 64 is connected to virtual ground by way of a capacitor 65 while the negative or inverting input of amplifier 64 is connected to its output by means of a resistor 66 and a capacitor 67 connected in parallel to one another to set the gain of amplifier 64. The output 68 of amplifier 64 is connected to the inverting input of amplifier 74 through a resistor 69. The non-inverting input of amplifier 74 is then connected to virtual ground while the negative input is connected to its output 78 by means of a resistor 76 and a capacitor 77 connected in parallel to one another to set the gain of amplifier 74. Output 78 is connected to the positive input of amplifier 64 through feedback resistor 79. Amplifiers 64 and 74 along with their associated components form preamplifier circuitry 24 diagrammed in FIG. 2.

Moreover, the output of preamplifier circuitry 24 is connected to a bandpass filter 26 by connecting output 78 of amplifier 74 to the inverting negative input of amplifier 84 through a resistor 85 and a capacitor 86 connected in series. The interconnect 87 between resistor 85 and capacitor 86 is connected to virtual ground by means of resistor 88, and it is connected to the output 90 of amplifier 84 by means of a capacitor 89. The positive input of amplifier 84 is connected to virtual ground, and the negative input is connected to output 90 by means of a resistor 91. The center frequency and bandwidth of this filter is thus set by resistors, 85, 88 and 91 along with capacitors 86 and 89.

The filtered signal from output 90 of amplifier 84 is then processed by amplifier 28 (FIG. 2) which includes amplifier 94 which has a positive input connected to virtual ground and a negative input receiving the filtered signal from output 90 by way of resistor 96. The negative input of amplifier 94 is also connected to its output 98 by way of resistor 97. The output 98 of amplifier 94 is also connected to virtual ground by way of a potentiometer 99. Arm 100 of potentiometer 99 then provides the input signal 32 for the remainder of the processing circuitry as shown at "A" in FIG. 3(a). Amplifiers 64, 74, 84 and 94 are preferably stages of a quad-amplifier integrated circuit chip, such as an LM-837 available from National Semi-Conductor, or any equivalent chip.

With reference to FIG. 3(b), the input signal 32 from "A" is connected through a capacitor 101 to pin one of chip 60 which, as noted above, is preferably an NE/-SA605 chip. As shown in diagrammatic form, this chip has internally configured circuitry including a Gilbert Cell mixer device 103, a buffer 104, an oscillator 105, high-frequency/high-gain amplification circuitry 106 and RSSI circuitry 107. With reference to FIG. 3(b), pin two of chip 60 is connected to the negative rail, $V_{ee}$, by way of capacitor 102. Pins three and four of chip 60 are associated with the oscillator 105 with the oscillation frequency being set by means of the components bridging pins three and four, which circuit topology is designed as a Colpitts L-C tank. Here, pins three and four are interconnected by means of a capacitor 110. Pin three is connected to $V_{ee}$ by way of a capacitor 112 and a resistor 113 connected in parallel. Pin four is connected to $V_{ee}$ by means of capacitors 114 and 115 connected in series. An inductor 116 is connected in parallel across capacitor 115. This circuitry, along with the internal components of chip 60 form oscillator 34 that provides the reference signal that is combined with the input signal at pin one. Preferably, this frequency is turned to 38 kHz so that the mixed signal will have an audible 2 kHz component when the ultrasonic signal is 40 kHz (40 kHz−38 kHz=2 kHz) along with high frequency components derived from the sum of the input frequency and the reference frequency (and its harmonics).

The output of the mixer of chip 60 is at pin twenty, and a composite signal filter is provided to remove oscillator leakage from the composite signal. In FIG. 3(b), this composite signal filter is provided by an L-C tank formed by capacitor 120 and inductor 121 connected in parallel thereto which forms a band reject filter (and with capacitor 122 the low pass filter 42) (FIG. 2). This L-C tank passive filter is tuned to a frequency range to remove signals having a frequency of 38 kHz. The low pass filter should have a band width that is approximately the same as the band width of the bandpass filter 26. The L-C tank acts as a trap in order to remove leaked oscillator frequency, and higher intermodulation products from the composite signal by shorting them to $V_{ee}$ through capacitor 122. Capacitor 123 couples the low frequency products to the internal amplifier circuitry 106 of chip 60 by connecting to pin eighteen as a second component of the filtered composite signal. Capacitor 124 interconnects pin seventeen and pin nineteen, and pin seventeen is connected to $V_{ee}$ by way of capacitor 125. Capacitors 124 and 125 set the feedback and bypass for the internal amplifier circuitry 106 of chip 60 to optimize desired signal-to-noise ratio.

Output from a first pair of internal amplifiers of internal amplifier circuitry is at pin sixteen, and is filtered by another low pass filter (not shown in FIG. 2) formed by resistor 131 and capacitor 132 to remove any high frequency components that might have been amplified or introduced by the internal amplifiers. Here, pin sixteen is shown to be connected to $V_{ee}$ by way of resistor 131 and capacitor 132 connected in series. Capacitor 133 couples the output of this filter, at the connection between resistor 131 and capacitor 132, to a second set of internal amplifiers in chip 60 by connecting to pin fourteen of chip 60. Capacitors 134 and 135 set the bypass and feedback of these two internal amplifiers. Here, capacitor 134 interconnects pins twelve and thirteen of chip 60 while pin thirteen is connected to $V_{ee}$ by way of capacitor 135.

The four internal amplifiers of internal amplifier circuitry 106 are connected to the internal RSSI circuitry 107 of chip 60 in order to produce a signal strength indicator signal at pin seven of chip 60. This signal is connected to $V_{ee}$ by way of potentiometer 141 and capacitor 142 connected in parallel. Arm 143 of potentiometer 141 provides a signal strength output to visual display 16, as described below. Capacitor 142 filters AC ripple of the RSSI signal, and its value determines the speed that the RSSI can change. A small value will cause a meter to respond very fast, but it may be difficult to read, especially if the input signal fluctuates. Pins five and six are connected together and to $V_{cc}$; pins five and six are also connected to $V_{ee}$ by way of capacitors 144 and 145 connected in parallel. Thus, power is supplied to chip 60.

Audio output is obtained from mixer 36, and is presented to pin two of chip 150 by way of a capacitor 151 and a resistor 152 connected in series. Chip 150 is preferably a TDA-7052, LM 380 or equivalent power audio amplifier. Pins two and three of chip 150 are connected together by means of a resistor 153 and a capacitor 154 connected in parallel. Pins three and six of chip 150 are connected to $V_{ee}$ and pin one is connected to $V_{cc}$ to provide power for chip 150. Pins five and eight of chip 150 thus provide the audio output which may be connected to the audio display, such as earphones 18, shown as earphone jacks 160.

The signal strength indicator signal from arm 143 of potentiometer 141 is provided to pin five of an LM 3914 bar graph driver, designated as chip 170. Chip 170 is preferably a LM 3914 linear display chip or an LM 3915 logarithmic display chip, with these chips being available from National Semi-Conductor of Sunnyvale, Calif. Pins two and eight of chip 170 are each connected to $V_{ee}$. Pin three is directly connected to $V_{cc}$ to provide power for chip 170, and pin three is further connected to $V_{ee}$ by way of capacitor 171. Pins six and seven of chip 170 are connected together and are connected to $V_{ee}$ by means of a resistor 172 and a potentiometer 173 connected in parallel. Arm 174 of potentiometer 173 is connected to pin four of chip 170.

Chip 170 drives an LED display such as HDSP-4830 available from the Hewlett-Packard Co. of Cupertino, Calif. This diode array 180 includes a plurality of light emitting diodes such as initial diode 181 and final diode 182 which are powered between $V_{cc}$ and a respective driving pin of chip 170. Initial diode 181 includes a resistor, such as resistor 191, connected in parallel to prevent diode 181 from turning on when other diodes are on in a single moving diode display. Chip 170 acts to sequentially complete the circuit through the set of diodes in the display according to the intensity of the signal from arm 143 of variable resistor 141. Thus, the number of diodes in the series of diodes indicates the signal strength, as is known in the art.

Figure 4:
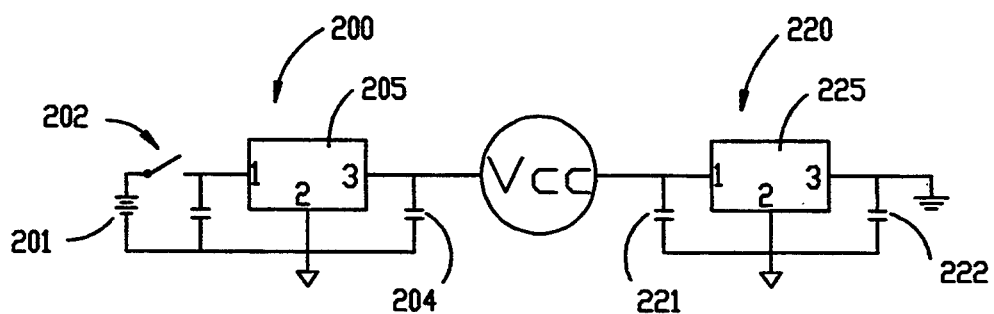
FIG. 4 is a circuit diagram of a suitable power supply with voltage regulator and power supply splitter for the ultrasonic detector of FIGS. 1-3.

Power for the circuitry described above is provided by means of a voltage regulator 200 and a power supply splitter 220 shown in FIG. 4. Voltage regulator 200 is provided by a chip 205 which is preferably an LM 2931Z5 microcircuit available from National Semi-Conductor of Sunnyvale, Calif. Pin one of chip 205 is connected to the positive terminal of battery 201 by way of a switch 202. Pin one is also connected to the negative terminal of battery 201 by way of capacitor 203. Pin two of chip 205 is connected to the negative terminal of battery 201 which defines the negative rail or $V_{ee}$. Pin three of chip 205 is connected to $V_{ee}$ through capacitor 204 so that the positive rail or $V_{cc}$ is produced at this pin three. The power supply splitter 220 used to produce the virtual ground is provided by means of a chip 225 which may be a TLE 2426 integrated circuit available from Texas Instruments of Dallas, Tex. Pin one of chip 225 is connected to the positive rail, $V_{cc}$, and to the negative rail, $V_{ee}$, through capacitor 221. Pin two of chip 225 is connected to $V_{ee}$, and pin three of chip 225 is connected to the negative rail $V_{ee}$ through capacitor 222. Thus, pin three provides the virtual ground, $V_{gnd}$ mid-way between the positive and negative rails. The preferred voltage range is approximately five volts so that $V_{cc}$ is about +2.5 volts while $V_{ee}$ is about −2.5 volts with respect to this $V_{gnd}$.

With the above described circuitry in mind, a component chart including selected values is set forth in the following Table I.

TABLE I

| Resistors | |
|---|---|
| Element | Value (in ohms) |
| 66 | 56k |
| 69 | 1k |
| 76 | 100k |
| 79 | 47k |
| 85 | 10k |
| 88 | 270 |
| 91 (R7) | 39k |
| 96 (R8) | 1k |
| 97 (R9) | 47k |
| 99 | 0-10k |
| 113 | 22k |
| 131 | 47k |
| 141 | 0-100k |
| 152 | 15k |
| 153 | 5.6k |
| 172 | 1k |
| 173 | 0-5k |
| 191 | 10k |

| Capacitors | |
|---|---|
| Element | Value |
| 65 | 0.1 μF |
| 67 | 150 pF |
| 77 | 330 pF |
| 86 | 1.0 nF |
| 89 | 1.0 nF |
| 101 | 0.1 F |
| 102 | 0.1 |
| 110 | 4.7 nF |
| 112 | 4.7 nF |
| 114 | 1 μF |
| 115 | 47 nF |
| 120 | 47 nF |

TABLE I-continued

| 122 | 1.0 μF |
|---|---|
| 123 | 0.1 μF |
| 124 | 47 μF |
| 125 | 1.0 μF |
| 132 | 0.1 μF |
| 133 | 0.1 μF |
| 134 | 1.0-2.2 μF |
| 135 | 1.0 μF |
| 142 | 2.2 μF |
| 144 | 0.1 μF |
| 145 | 1 μF |
| 151 | 47 nF |
| 154 | 0-4.7 μF |
| 171 | 1 μF |
| 203 | 1 μF |
| 204 | 10 μF or higher |
| 221 | 10 μF or higher |
| 222 | 1 μF |

| Coils | |
|---|---|
| Element | Value |
| 116 | 270 μH, Qmin = 30 (Preferably Shielded) |
| 121 | 270 μH, Qmin = 30 (Preferably Shielded) |

Several circuitry architecture requirements for the ultrasonic detector 10 should be noted where the NE602, NE/SA605 or similar high frequency microcircuits are employed to provide the Gilbert Cell device 103 and the oscillator 105. Since these devices are designed for high frequency applications, it is difficult to achieve oscillation in the low ultrasonic range. In particular, it is necessary to increase the Colpitts L-C tank coupling capacitor 114 to a high value because of the low frequency required. To achieve the oscillation there is a minimum required inductor "Q" of 30 and a minimum coupling capacitance of 100 nF. However, it is preferred to use a higher value of 1 μF to assure that the oscillator will "start", and it is preferred that capacitor 114 be a ceramic component. Indeed, if capacitor 114 is less than 100 nF and the inductor "Q" is less than 30, then the oscillator may not start. Coil 116 should, of course, be shielded as should coil 121.

Moreover, it should be appreciated that, if the ultrasonic signal exactly matches the reference signal, a null composite signal may result. This does not pose a particularly difficult issue, however, since movement of the detector 10 will cause a slight doppler shift generating a low frequency audible signal in the 20–100 Hz range. Naturally, the detection band can be altered in range, but the bandpass filter should be matched to the sensitivity range of the sensor 14. Multiple sensors may be used to expand the band width of detection; here, the bandpass filter may need to be eliminated. In any event, changes to the circuit architecture necessary to implement this detector circuit for specific ultrasonic applications can be made according to known circuitry theory.

Figure 5:
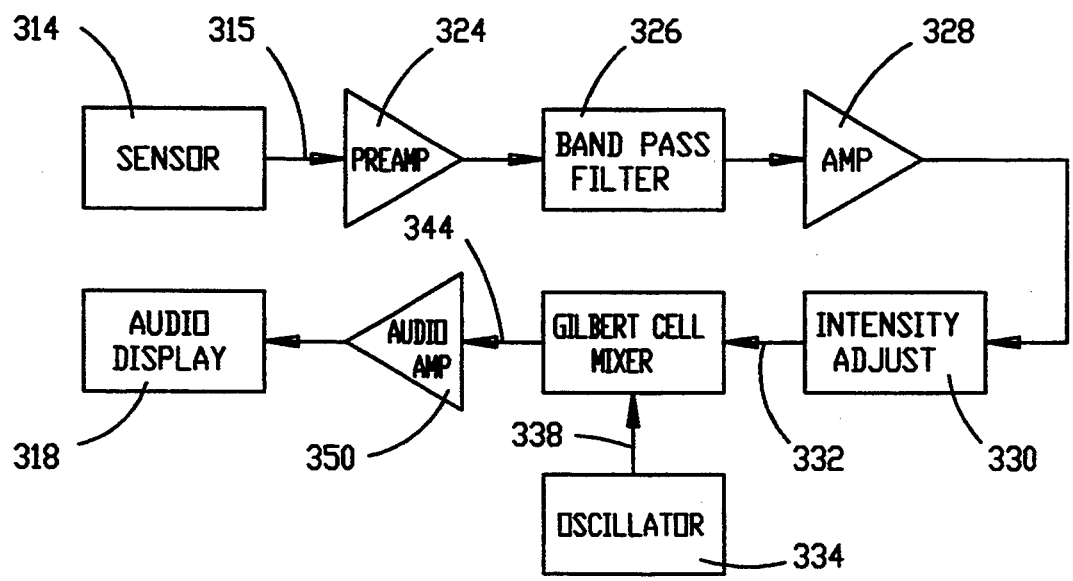
FIG. 5 is a diagrammatic view of a simplified ultrasonic detector circuit according to the present invention.

A simplified diagram of the circuit according to the present invention is shown in FIG. 5. Here, the visual display is eliminated as is the received signal strength indicator so that the simplified ultrasonic detector shown in FIG. 5 may be used to produce only an audio output. In FIG. 5, sensor 314 detects an ultrasonic signal and presents this as electrical signal 315 to a preamplifier 324 which is then filtered to a desired frequency band by means of bandpass filter 326. The resulting signal is amplified by amplifier 328 and the intensity is adjusted by intensity adjusting circuitry 330. This initial amplification and filtering circuitry is similar to that described above. The input signal, at 332, is input into a Gilbert Cell mixer which also receives a reference signal 338 from an oscillator 334 so that the input signal 332 and the reference signal 338 are heterodyned to produce a composite signal 344. Here, the Gilbert Cell mixer 336 can be configured by individual components, as known in the art, and, likewise, oscillator 334 may be configured by discreet components. On the other hand, as noted above, a single integrated circuit chip, NE602, available from Signetics, provides these two microcircuits although this chip is designed to act at frequencies much higher than the ultrasonics described above. In any event, the composite signal 334 may then be amplified by audio amplifier 350 and displayed by audio display 318. Of course, if desired, a low-pass filter may be inserted between Gilbert Cell mixer 336 and audio amplifier 350 to remove unwanted high-frequency signals, leakage and intermodulation products from the audio display.

Accordingly, the present invention has been described with some degree of particularity directed to the exemplary embodiments of the present invention. It should be appreciated, though, that the present invention is defined by the following claims construed in light of the prior art so that modifications or changes may be made to the preferred embodiment of the present invention without departing from the inventive concepts contained herein.

I claim:

1. An ultrasonic detector for monitoring ultrasonic signals having ultrasonic frequencies over a selected range and for producing an audible signal in response thereto, comprising:
   (a) a sensor element operative in response to ultrasonic signals to produce an electrical signal;
   (b) amplification and filter circuitry operative in response to the electrical signal to remove all frequency components thereof not within the selected range and to produce an input signal at a selected input frequency and signal amplitude;
   (c) an oscillator operative to produce a reference signal at a selected reference frequency;
   (d) a mixer operative to receive the input signal and the reference signal to produce a mixed composite signal at a frequency between 0 Hz and 20 kHz at a composite signal amplitude corresponding to the input signal amplitude, said mixed composite signal being spit into first and second components thereof;
   (e) a first amplifier operative to amplify the first component of said mixed composite signal to produce an audio signal;
   (f) a second amplifier operative to amplify the second component of said mixed composite signal;
   (g) a received signal strength indicator circuit operative to monitor said second amplifier to produce a signal strength indicator signal that is linearly correlated to the input signal;
   (h) an audio output device for producing an audio sound in response to said audio signal; and
   (i) a visual display for producing visible output in response to said signal strength indicator signal whereby said visible output indicates the strength of the second component of said mixed composite signal.

2. An ultrasonic detector according to claim 1 wherein the electrical signal has a first frequency that is equivalent to the ultrasonic frequency and at a first signal amplitude that is proportional to the ultrasonic amplitude.

3. An ultrasonic detector according to claim 1 wherein said amplification and filter circuitry includes a band pass filter having a frequency band centered at a target ultrasonic frequency.

4. An ultrasonic detector according to claim 3 wherein said frequency band is centered at 40 kHz, +/−3 kHz.

5. An ultrasonic detector according to claim 1 wherein the reference frequency is in a range of 20 kHz to 100 kHz.

6. An ultrasonic detector according to claim 5 wherein the reference frequency is 38 kHz +/−500 Hz.

7. An ultrasonic detector according to claim 1 wherein said mixer is a Gilbert Cell mixer device.

8. An ultrasonic detector according to claim 7 wherein said oscillator includes a Colpitts L-C tank circuit having a Q of at least 30.

9. An ultrasonic detector according to claim 7 wherein said Gilbert Cell mixer device and said oscillator are configured on a common integrated circuit chip.

10. An ultrasonic detector according to claim 9 wherein said second amplifier and said received signal strength indicator circuit are configured on said common integrated circuit chip.

11. An ultrasonic detector according to claim 1 wherein said visual display is non-linear.

12. An ultrasonic detector according to claim 1 including a low pass filter connected to said mixer to receive the composite signal, said low pass filter operative to remove high frequency signals from said composite signal.

13. An ultrasonic detector according to claim 12 wherein said low pass filter is tuned to 7 kHz.

14. An ultrasonic detector according to claim 1 wherein the output signal strength is selectively adjustable.

15. An ultrasonic detector according to claim 1 wherein said sensor has a center frequency of 40 kHz and wherein said mixed composite signal has a frequency between 0 Hz and 6 kHz.

16. An ultrasonic detector for monitoring ultrasonic signals having ultrasonic frequencies over a selected range and for producing an audible sound corresponding thereto, comprising:
   (a) a sensor element responsive to a received ultrasonic signal to produce an electrical signal;
   (b) amplification and filter circuitry operative in response to the electrical signal to produce an input signal at an input signal frequency and amplitude;
   (c) an oscillator operative to produce a reference signal at a reference frequency and amplitude;
   (d) a Gilbert Cell mixer device to receive the input signal and the reference signal to produce a mixed composite signal at a composite frequency in an audio range and at a composite signal amplitude proportional to the input signal amplitude;
   (e) a first amplifier operative to amplify the composite signal to produce an audio signal; and
   (f) an audio output device for producing an audible sound in response to said audio signal.

17. An ultrasonic detector according to claim 16 wherein said oscillator includes a Colpitts L-C tank circuit having a Q of at least 30.

18. An ultrasonic detector according to claim 16 wherein said Gilbert Cell device and said oscillator are configured on a common integrated circuit chip.

19. An ultrasonic detector according to claim 18 including a second amplifier and an RSSI circuit associated with said second amplifier for producing a received signal strength indicator.

20. An ultrasonic detector according to claim 19 wherein said second amplifier and said RSSI circuit are configured on said common integrated circuit chip.

21. An ultrasonic detector according to claim 19 including a low pass filter operative to remove oscillator leakage, high frequency noise and high frequency intermodulation components from said composite signal to produce a filtered composite signal, said first amplifier operative to amplify a first component of said filtered composite signal to produce the audio signal and said second amplifier operative to amplify a second component of said filtered composite signal to produce a strength indicator signal.

22. An ultrasonic detector according to claim 21 including a visual display for producing visible output in response to said strength indicator signal whereby said visible output indicates the strength of the second component of said filtered composite signal.

23. An ultrasonic detector according to claim 22 wherein said visual display is non-linear.

24. An ultrasonic detector according to claim 15 including a composite signal filter connected to said Gilbert Cell mixer to receive the composite signal, said composite filter tuned to the reference frequency and operative to remove oscillator leakage from said composite signal.

25. An ultrasonic detector according to claim 16 wherein the input signal amplitude is selectively adjustable.

* * * * *